Feb. 14, 1956 T. F. SMITH 2,734,420
DRIVE-IN THEATRE WITH INDIVIDUAL CAR SCREENS
Filed Nov. 17, 1952 2 Sheets-Sheet 1

Tom F. Smith
INVENTOR.

Feb. 14, 1956 T. F. SMITH 2,734,420
DRIVE-IN THEATRE WITH INDIVIDUAL CAR SCREENS
Filed Nov. 17, 1952 2 Sheets-Sheet 2
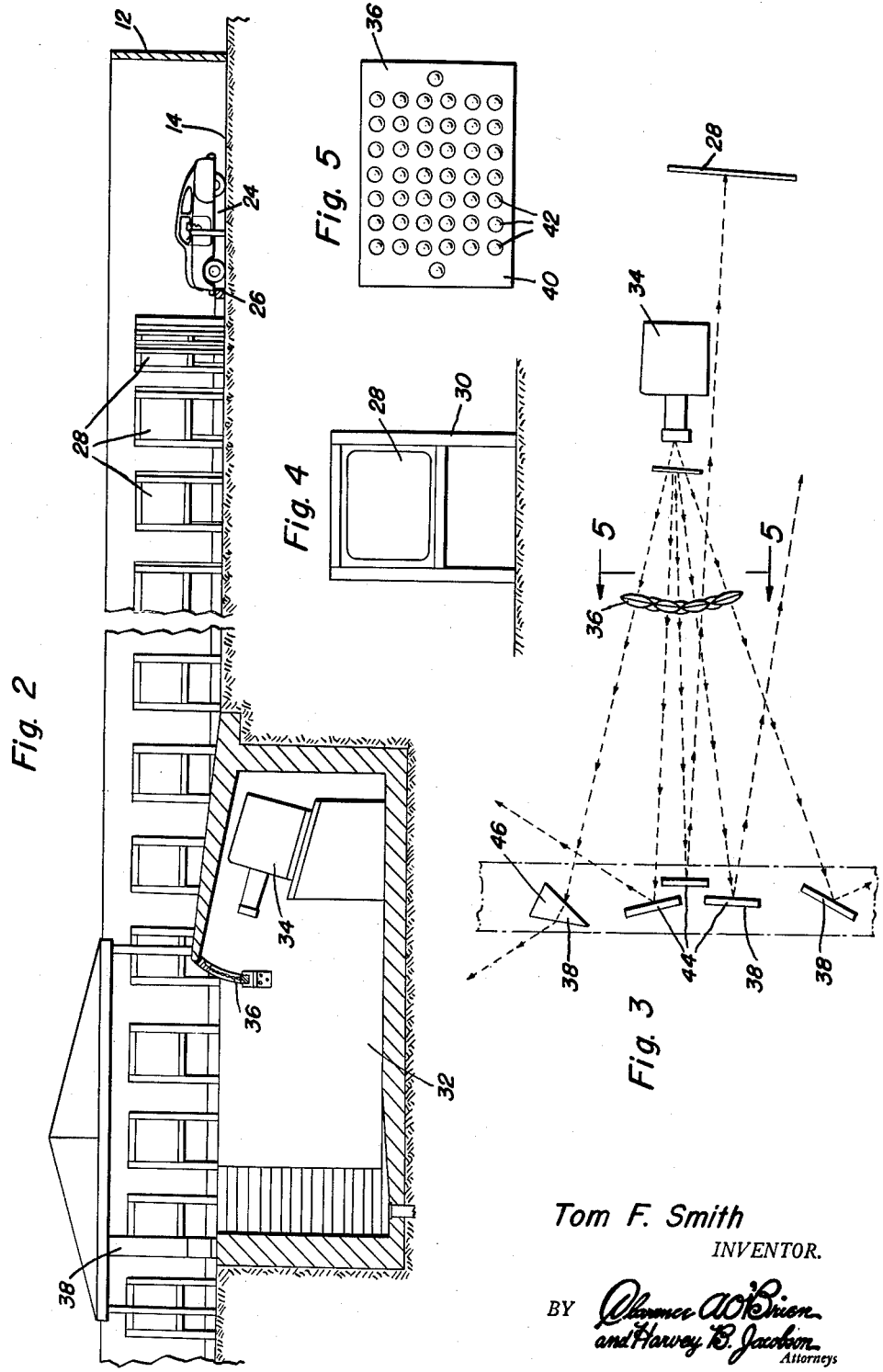
Tom F. Smith
INVENTOR.

United States Patent Office 2,734,420
Patented Feb. 14, 1956

2,734,420

DRIVE-IN THEATRE WITH INDIVIDUAL CAR SCREENS

Tom F. Smith, Urbana, Mo., assignor to Autoscope, Inc., Urbana, Mo., a corporation of Missouri Application November 17, 1952, Serial No. 321,005

8 Claims. (Cl. 88—24)

This invention comprises novel and useful improvements in a drive-in theatre with individual car screens and generally pertains to a theatre arrangement whereby a plurality of viewing screens are simultaneously energized by a single projector for producing visible images thereon, each screen being positioned for use by one or more cars, or one or more persons.

A further object of the invention is to provide a theatre arrangement whereby an individual viewing screen is provided at each of a plurality of stations to provide the same size picture with the same intensity of illumination and clarity of detail for each of the patrons occupying that viewing station.

A further object of the invention is to provide a theatre arrangement in conformity with the foregoing objects wherein a single image projector shall be capable of simultaneously providing a substantially identical image on each of a plurality of viewing screens which substantially completely encircle and surround the projector.

Yet another object of the invention is to provide a drive-in theatre wherein a single projector simultaneously illuminates a plurality of viewing screens which substantially entirely surround the projector, and wherein provision is made for parking a plurality of cars, one or more at each of the viewing stations and substantially upon the same level, thereby assuring substantially equal visibility of the images from the projector, for each car.

Yet another object of the invention is to provide a theatre arrangement, equally adapted for indoor or outdoor use, and wherein a single projector simultaneously produces substantially the same image on each of a plurality of screens disposed about the projector.

These together with other objects and advantages which will become subsequently apparent resides in the details of construction and operation as more fully hereinafter described and claimed, reference being had to the accompanying drawings forming a part hereof, wherein like numerals refer to like parts throughout, and in which:

Figure 1 is a top plan view diagrammatically indicating a suitable embodiment of theatre constructions especially adapted for use as a drive-in or outdoor theatre whereby an individual viewing screen is provided for each car or each plurality of cars and energized from a single projector, and wherein the viewing screens and cars are disposed at angular intervals about and entirely surrounding the projector;

Figure 2 is a vertical longitudinal sectional view taken substantially upon the plane indicated by the section line 2—2 of Figure 1 and showing certain arrangements of the projector, the lens assembly, the light directing element assembly and the viewing screens;

Figure 3 is a diagrammatic view upon an enlarged scale of the relative arrangements of the projector, lens assembly and assembly of light directing elements;

Figure 4 is an elevational view of one of the screens; and

Figure 5 is an elevational view of the lens assembly forming a part of this invention.

Figure 1:
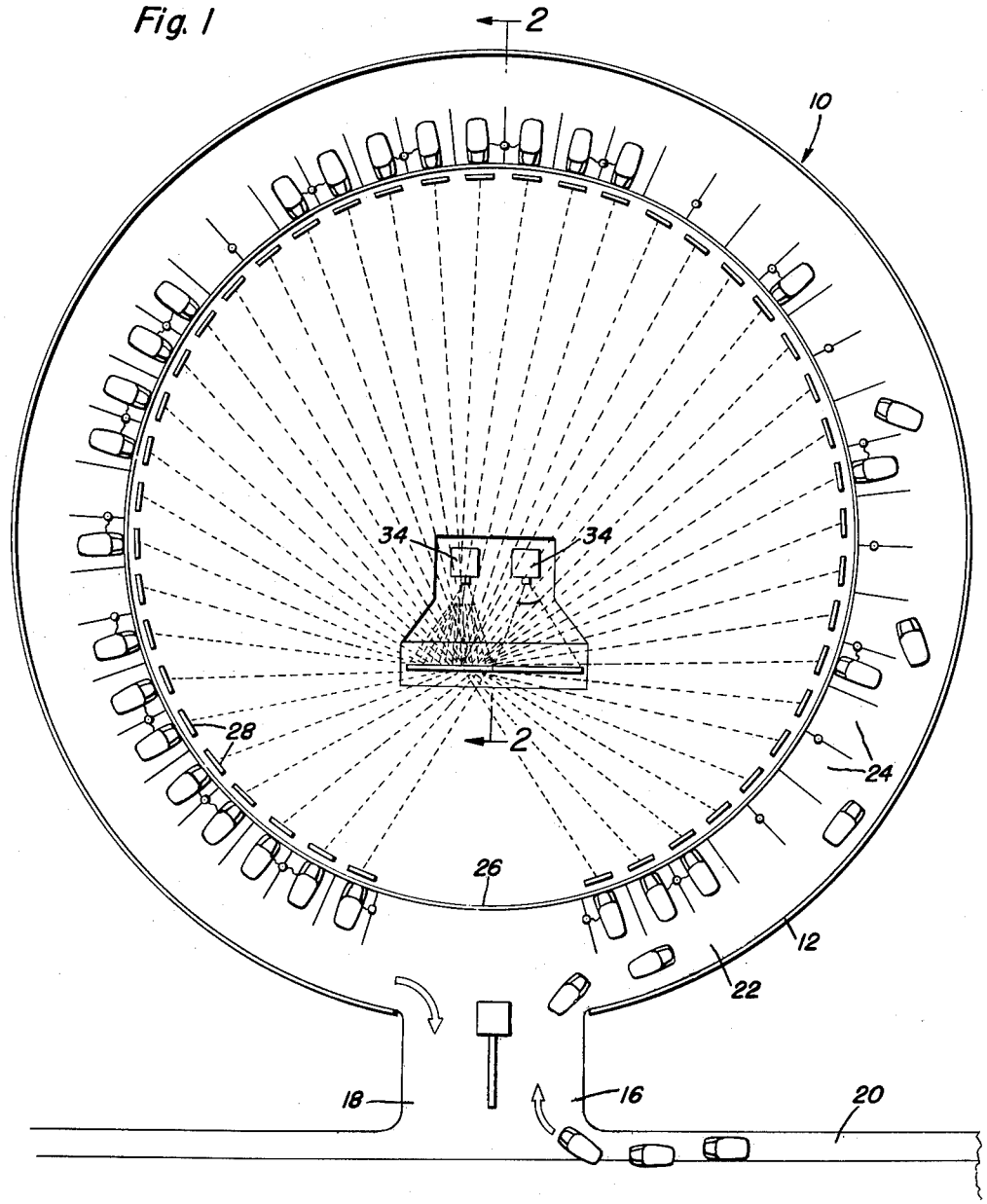

In the accompanying drawings there is disclosed a theatre indicated generally by the numeral 10 and which may be either an indoor or outdoor auditorium or amphitheatre as desired, the same preferably but not necessarily including an enclosing wall 12, and being provided with a flat or level floor 14. This latter element may consist merely of the surface of the lot occupied by the theatre if the latter is of the outdoor or drive-in type, or may constitute the floor of a building if the theatre is of the indoor type. The theatre as illustrated in the drawings of the drive-in type and will be so referred to hereinafter, although it will be readily appreciated that the principles of this invention are not limited to this particular type of theatre.

Where desired, and particularly where it is preferable to obtain the maximum capacity for a given area, the enclosing wall 12 is preferably circular as shown in Figure 1, being provided with an entrance way 16 and an exit 18 whereby vehicles or persons may enter or leave the enclosure of the theatre from a highway or the like 20. In communication with the entrance and exit, and immediately adjacent the inside of the enclosure wall 12 there is provided a passageway 22, whereby persons or vehicles may move about the enclosure to selected viewing stations 24. These stations may be of a size to accommodate a single automative vehicle or a plurality of automative vehicles if desired, and are disposed radially of the center of the circular enclosure and at substantially equal angular intervals about the center.

A low wall or barricade 26, which also may be of circular construction, is disposed radially inwardly of the passageway 22, and constitutes the inner wall for the stalls or viewing stations 24, as will be apparent from Figures 1 and 2.

Disposed at each of the viewing stations 24 is a viewing screen 28 carried by suitable supporting framework 30. This screen is preferably of a translucent material so that an image imposed thereon from a light beam from the interior of the circle of screens will pass through the screen and be visible to the patrons of the associated viewing station 24, whether such viewing station is occupied by one or more cars, or is provided with seats for the patrons.

It is also considered desirable to provide a loud speaker to serve these individual viewing stations 24, in the manner customary and well known with regard to drive-in theatres.

As so far described, it will now be apparent that the present invention provides a relatively small screen for each viewing station, whereby each viewing station is afforded equal visibility of the image and the most desirable and effective size of the image. Moreover, by this arrangement all of the viewing stations are disposed upon the same level, thereby avoiding the heretofore expensive and disadvantageous constructions of either arranging the viewing stations at different levels or providing an excessively large viewing screen to serve all of the viewing stations with a single image. Moreover, by this arrangement the viewing stations may continue entirely around the screen with no dead areas as regards visibility of the image, thereby economizing on space and accommodating a greater number of patrons.

It is a further and important feature of this invention to provide a single projecting station whereby one or more projectors may energize each and all of the viewing screens. In the embodiment illustrated, the projector station consists of a chamber or recess 32 disposed substantially centrally of the circular enclosing wall 12 and having one or more projectors each indicated generally by the numeral 34 and disposed in this chamber below the level of the floor 14. By thus recessing the projectors below the floor, the rays from the projectors may be directed upwardly and outwardly from the recess, in a manner set forth hereinafter, and thus may travel or be directed throughout the entire 360 degrees or that portion of the same which is occupied by the viewing stations 24.

In order to enable a single projector to activate each of the screens, there is provided as shown more clearly in Figures 2 and 3, a multiple lens assembly 36, see also Figure 5, together with an assembly of light directing elements 38, the lens assembly being interposed between the projector and the light directing elements, and the latter being optically interposed between the lens assembly and the individual screens 28.

Referring more particularly to Figure 5, it will be seen that the lens assembly 36 includes a supporting panel or framework 40 of any desired character, which as shown in Figures 2 and 3 may be curved as found to be necessary, and having a plurality of individual lenses 42. Each of these lenses breaks up the beam of light from the projector 34 into a plurality of beams, each of these divided beams being, in turn, directed to one of the light directing elements 38. The latter may consist of reflecting mirrors 44 where it is desired to reflect the beams from the lenses, prisms 46 where it is desired merely to reflect the beams, or in some instances simple lenses may be employed where it is desired merely to focus the beams. Each of the light directing elements 38 is so arranged as to cause a beam from one of the lenses 42 to be directed to and impinge upon the face of a screen 28. Thus, the beam projected from the projector 34 is divided into a plurality of rays or beams, each of which is, in turn, directed to one of the screens for activating the same. Obviously, the positioning and characteristics of the lenses 42 and of the light directing elements 38 may be appropriately chosen to cause an image of the same size to be projected upon each of the screens 28.

By this arrangement, as shown clearly in Figure 2, the beams of light from the projector after passing through the lens assembly, and impinging upon the light directing elements 38, will be directed at appropriate angular intervals about the circle of the viewing stations, and some instances above the top of the projecting station 32 to those viewing stations which are disposed upon the opposite side of the same.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is:

1. A theatre comprising a plurality of circumferentially arranged viewing screens, a projector centrally positioned between said screens and emitting a beam of light in a single direction, means interposed between said projector and said screens for simultaneously producing visible images upon said plurality of screens from said projector, some of said screens being disposed in positions directly behind said projector, said means comprising a plurality of light directing elements disposed between said projector and said screens for directing the beam of light from said projector to said screens, the beam of light striking each of said screens being acted on by a single one of said directing elements, said means further including a lens assembly disposed between said projector and said light directing elements, said lens assembly comprising a panel having a plurality of lenses mounted thereon, each of said lenses directing a beam of light to a single one of said light deflecting elements.

2. The combination of claim 1, wherein said lens assembly is positioned at a point spaced from said projector whereby a complete picture is received by each lens and transmitted thereby.

3. The combination of claim 2, wherein said screens are translucent for producing an image on the face remote from said projector.

4. An open air theatre comprising a level floor, a recess disposed centrally of said floor, a projector mounted in said recess and emitting a light beam in a single direction, a plurality of circumferentially spaced viewing screens mounted above said floor, means for simultaneously producing visible images on each of said screens from said projector, said screens being disposed at different angular intervals about said projector with some of said screens being disposed directly behind said projector, said floor having viewing stations at each screen for viewing the image projected thereon, said projector emitting the light beam at an angle upwardly from said recess, said means comprising a plurality of light directing elements mounted above said floor adjacent said recess, said elements directing said beam to each of said screens, the beam of light striking each of said screens being acted on by a single one of said directing elements, said means also comprising a lens assembly disposed in said recess between said projector and said light directing elements, said lens assembly comprising a panel having a plurality of lenses mounted thereon, each of said lenses directing a beam of light to a single one of said light deflecting elements.

5. The combination of claim 4, wherein said lens assembly is positioned at a point spaced from said projector whereby a complete picture is received by each lens and transmitted thereby.

6. The combination of claim 5, wherein said viewing screens are translucent and are disposed between said station and said projectors.

7. The combination of claim 5, wherein said viewing screens are translucent and are disposed between said stations and said projectors, said stations being adapted to each accommodate an automobile.

8. The combination of claim 7, wherein said screens are disposed in a common level and said light directing means are disposed in the same level.

References Cited in the file of this patent

UNITED STATES PATENTS

| 1,931,668 | Maurer | Oct. 24, 1933 |
| 2,041,194 | Lindenberg | May 19, 1936 |
| 2,041,195 | Lindenberg | May 19, 1936 |
| 2,373,013 | Clark et al. | Apr. 3, 1945 |

FOREIGN PATENTS

| 93,077 | Austria | June 11, 1923 |
| 99,122 | Austria | Jan. 26, 1925 |